United States Patent
Jones et al.

(10) Patent No.: US 7,197,186 B2
(45) Date of Patent: Mar. 27, 2007

(54) DETECTING ARBITRARILY ORIENTED OBJECTS IN IMAGES

(75) Inventors: Michael J. Jones, Cambridge, MA (US); Paul A. Viola, Kirkland, WA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 714 days.

(21) Appl. No.: 10/463,726

(22) Filed: Jun. 17, 2003

(65) Prior Publication Data
US 2004/0258313 A1 Dec. 23, 2004

(51) Int. Cl.
G06K 9/62 (2006.01)
(52) U.S. Cl. .................................................... 382/224
(58) Field of Classification Search ................ 382/103, 382/159, 170, 181, 190, 209, 224, 305
See application file for complete search history.

(56) References Cited

U.S. PATENT DOCUMENTS

| | | | |
|---|---|---|---|
| 6,128,397 A | 10/2000 | Baluja et al. ................ 382/118 |
| 6,546,362 B1 * | 4/2003 | Guo et al. ...................... 703/1 |
| 6,944,319 B1 * | 9/2005 | Huang et al. ................ 382/118 |
| 2003/0123713 A1 * | 7/2003 | Geng ........................... 382/118 |
| 2004/0066966 A1 * | 4/2004 | Schneiderman ............. 382/159 |
| 2005/0058337 A1 * | 3/2005 | Fujimura et al. ............ 382/159 |

OTHER PUBLICATIONS

Vailaya, et al "Automatic Image Orientation Detection", pp. 1-5, 1998.*
Rowley et al., "Rotation invariant neural network-based face detection," *Proceedings of the IEEE Conference on Computer Vision and Pattern Recognition*, pp. 38-44, 1998.
Sung et al., in "Example-based learning for view based face detection," *IEEE Patt. Anal. Mach. Intell.*, vol. 20, pp. 39-51, 1998.
Rowley et al., "Neural network-based face detection," *IEEE Patt. Anal. Mach. Intell.*, vol. 20, pp. 22-38, 1998.

* cited by examiner

*Primary Examiner*—Daniel Mariam
(74) *Attorney, Agent, or Firm*—Dirk Brinkman; Clifton D. Mueller; Gene V. Vinokur

(57) ABSTRACT

A method for detects a specific object in an image. An orientation of an arbitrary object with respect to an image plane is determined and one of a plurality orientation and object specific classifiers is selected according to the orientation. The arbitrary object is classified as a specific object with the selected orientation and object specific classifier.

10 Claims, 4 Drawing Sheets

200

DETECTING ARBITRARILY ORIENTED OBJECTS IN IMAGES

FIELD OF THE INVENTION

The present invention relates generally to the field of computer vision and pattern recognition, and more particularly to detecting arbitrarily oriented objects in images.

BACKGROUND OF THE INVENTION

Of all of the applications where computer vision is used, face detection presents an extremely difficult challenge. For example, in images acquired by surveillance cameras, the lighting of a scene is usually poor and uncontrollable, and the cameras are of low quality and usually distant from potentially important parts of the scene. Significant events are unpredictable. Often, a significant event is people entering a scene. People are typically identified by their faces. The orientation of the faces in the scene is usually not controlled. In other words, the images to be analyzed are substantially unconstrained.

Face detection has a long and rich history. Some techniques use neural network systems, see Rowley et al., "Neural network-based face detection," *IEEE Patt. Anal. Mach. Intell.*, Vol. 20, pp. 22–38, 1998. Others use Bayesian statistical models, see Schneiderman et al., "A statistical method for 3D object detection applied to faces and cars," *Computer Vision and Pattern Recognition*, 2000. While neural network systems are fast and work well, Bayesian systems have better detection rates at the expense of longer processing time.

The uncontrolled orientation of faces in images poses a particularly difficult detection problem. In addition to Rowley et al. and Schneiderman et al., there are a number of techniques that can successfully detect frontal upright faces in a wide variety of images. Sung et al., in "Example-based learning for view based face detection," *IEEE Patt. Anal. Mach. Intell.*, volume 20, pages 39–51, 1998, described an example-based learning technique for locating upright, frontal views of human faces in complex scenes. The technique models the distribution of human face patterns by means of a few view-based "face" and "non-face" prototype clusters. At each image location, a different feature vector is computed between the local image pattern and the distribution-based model. A trained classifier determines, based on the difference feature vector, whether or not a human face exists at the current image location.

While the definition of "frontal" and "upright" may vary from system to system, the reality is that many images contain rotated, tilted or profile faces that are difficult to detect reliably.

Non-upright face detection was described in a paper by Rowley et al., "Rotation invariant neural network-based face detection," *Proceedings of the IEEE Conference on Computer Vision and Pattern Recognition*, pages 38–44, 1998. That neural network based classifier first estimated an angle of rotation of a front-facing face in an image. Only the angle of rotation in the image plane was considered, i.e., the amount of rotation about z-axis. Then, the image was rotated to an upright position, and classified. For further detail, see, Baluja, et al., U.S. Pat. No. 6,128,397, "Method for finding all frontal faces in arbitrarily complex visual scenes," Oct. 3, 2000.

FIG. 1 show the steps of the prior art face detector. A rotation of a front facing face in an image 101 is estimated 110. The rotation 111 is used to rotate 120 the image 101 to an upright position. The rotated image 121 is then classified 130 as either a face or a non-face 131. That method only detects faces with in-plane rotation. That method cannot detect faces having an arbitrary orientation in 3D.

Therefore, there is a need for a system and method that can accurately detect arbitrarily oriented objects in images.

SUMMARY OF THE INVENTION

The invention provides a method for detecting a specific object in an image. An orientation of an arbitrary object in an image is determined and one of a plurality orientation and object specific classifiers is selected according to the orientation. The arbitrary object is classified as a specific object with the selected orientation and object specific classifier.

DETAILED DESCRIPTION OF THE PREFERRED EMBODIMENT

System Structure

Figure 1:
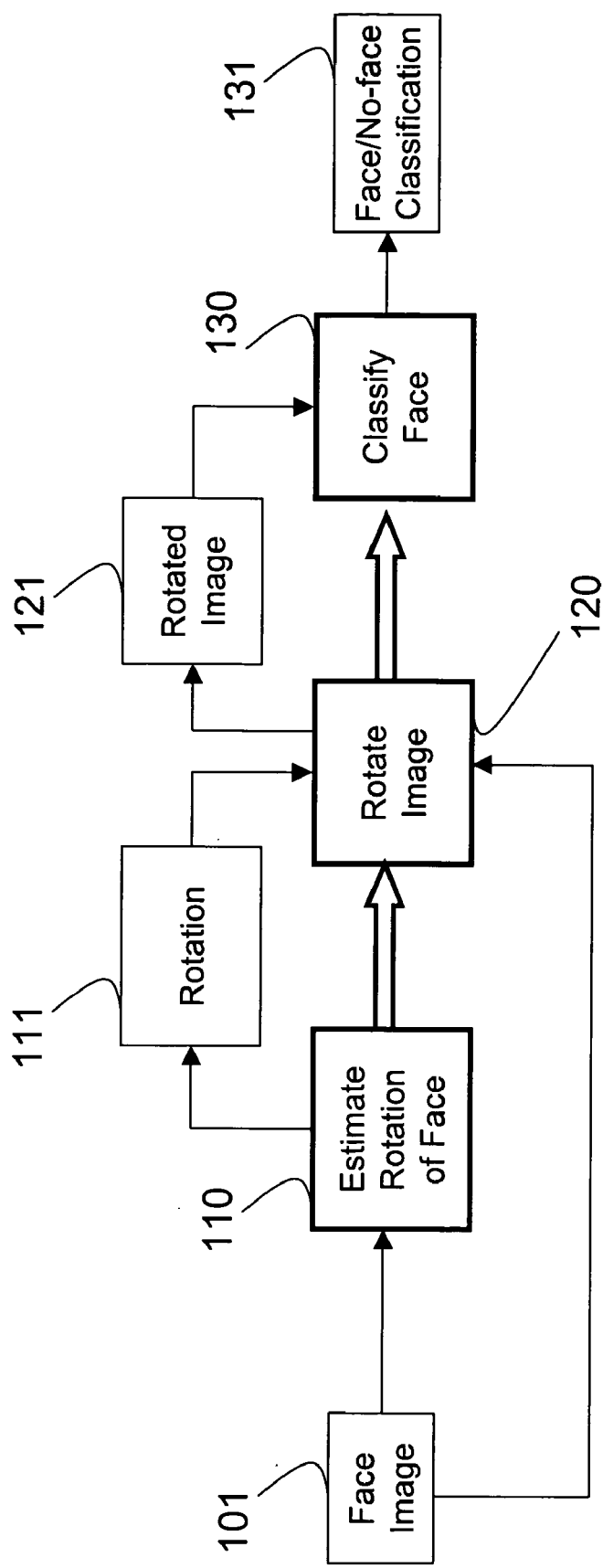
FIG. 1 is a flow diagram of prior art method for detecting in in-plane, rotated, front facing face.
Figure 2:
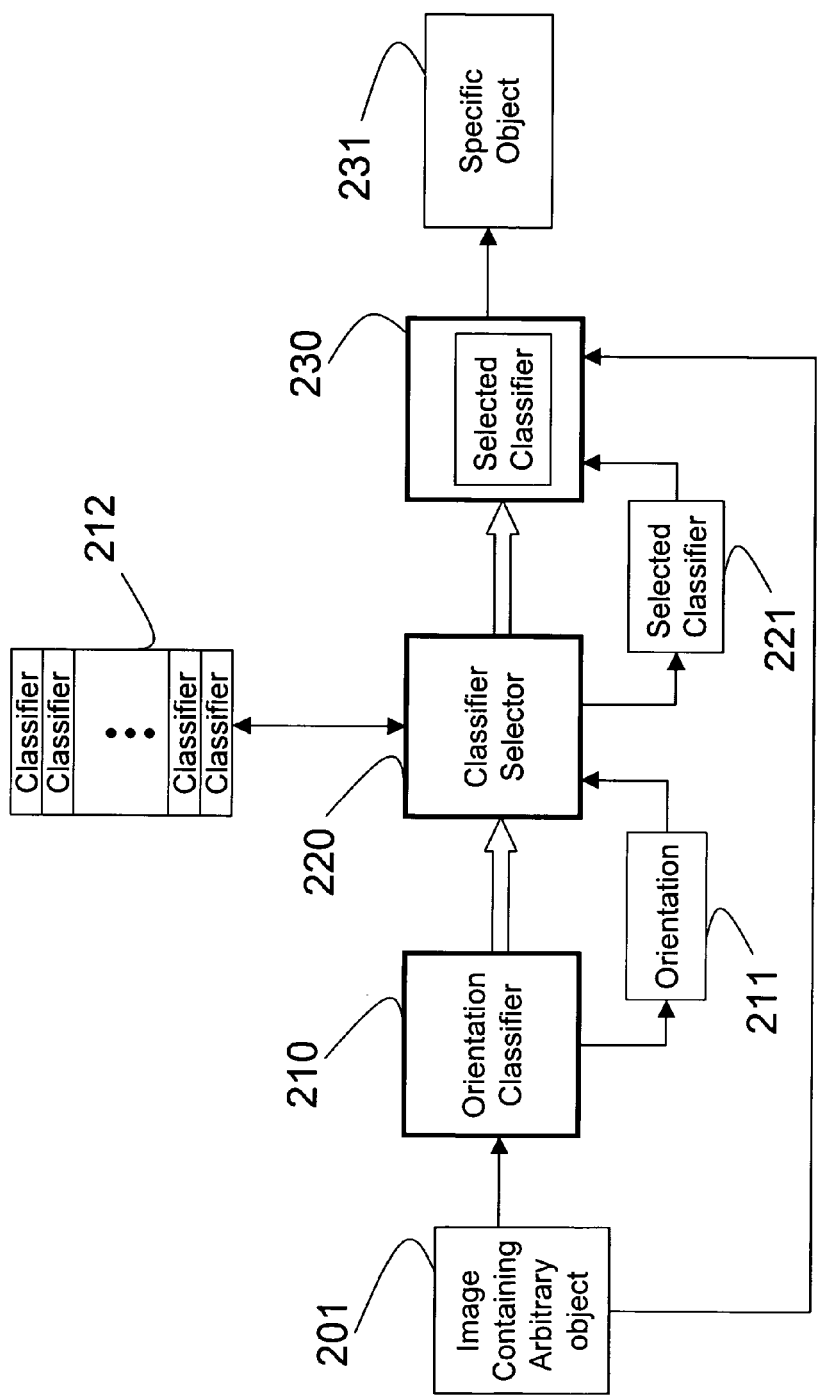
FIG. 2 is a block diagram of a system and method for detecting an object having an arbitrary orientation.
Figure 3A:
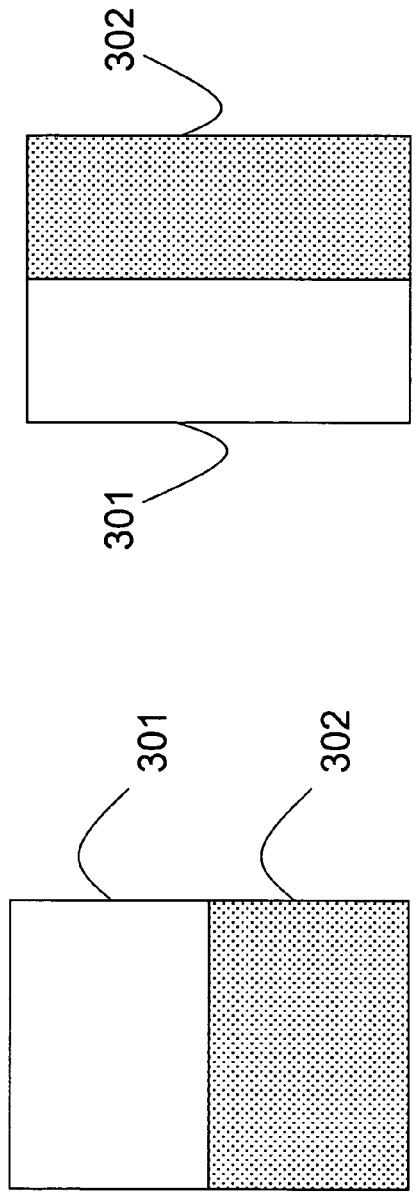
FIGS. 3A–3D are block diagrams of rectangular filters used by the invention.
Figure 3B:
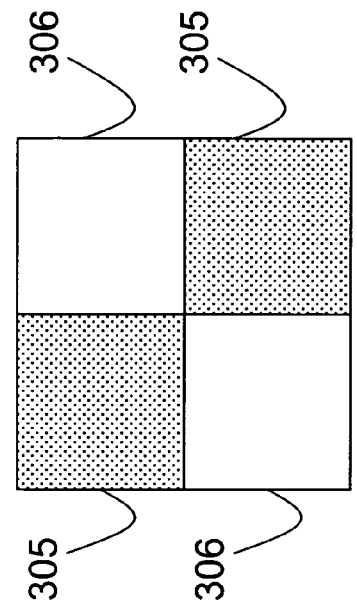
Figure 3C:
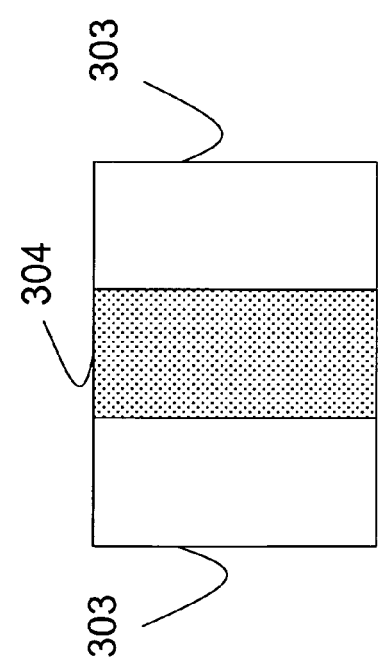
Figure 3D:
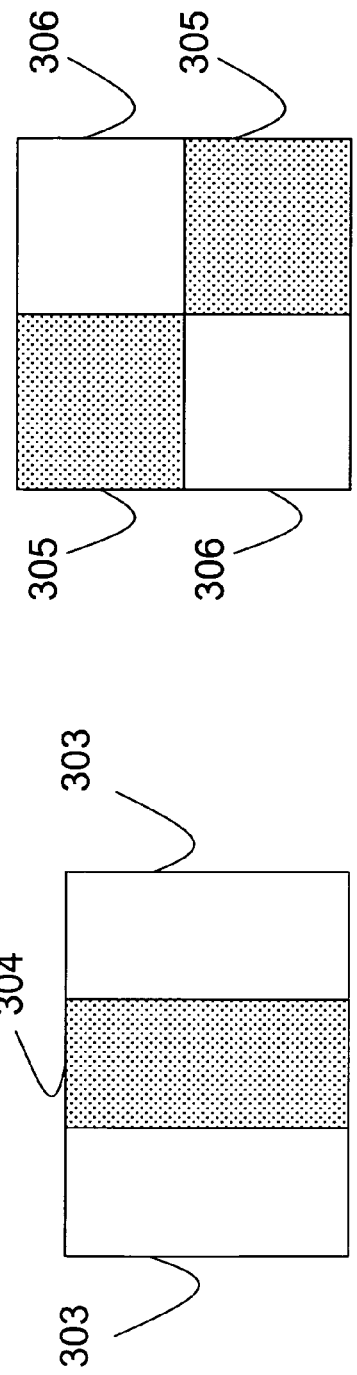

FIG. 2 shows a system 200 for detecting a specific object having an arbitrary orientation in an image 201 according to the invention. By orientation, we mean a rotation about any or all of the three major (x, y, and z axes), for example pitch, yaw, and roll, with respect to an image plane at the instant the image 201 is acquired. We distinguish our orientation from the single rotation about the z-axis of the prior art. In one example application, the objects detected in the images are faces, however, it should be understood that other arbitrarily oriented objects can also be detected. It should also be understood, from the perspective of the camera, that the same method can be used determine an orientation of a camera with respect to a fixed object.

The system 200 includes an orientation classifier 210, a classifier selector 220, and an orientation and object specific classifier 230, connected to each other. The system 200 takes as input an image including an arbitrary object 201 and outputs a detected specific object 231 in the image 201. The classifier selector 220 uses an orientation class 211 and a set of orientation and object specific classifiers 212 to output a selected classifier 221.

In a preferred embodiment, the image is partitioned into detection windows or "patches" of various sizes, for example, the entire image, four windows, each ¼ of the image, and so forth.

System Operation

During operation, a method first determines 210 an orientation class 211 of the arbitrary object in the image 201. An orientation and object specific classifier 221 is selected 220 from a set of orientation and object specific classifiers 212 according to the determined orientation class 211 of the arbitrary object in the image 201. The arbitrary object is then classified 230 as a specific object 231 with the selected orientation and object specific classifier 221.

The classifiers can be any known classifier, e.g., Bayesian, neural network based, support vector machine, decision tree, etc.

Orientation Classifier

The orientation classifier 210 is a multi-class classifier trained on only positive image samples of objects to be classified, e.g., faces. Positive image samples means that each image sample is an example of the specific object. The positive samples include the specific object in any or all of the possible orientations on the three major axes. Samples in the possible orientations of the arbitrary object with respect to the image plane at the instant the image is acquired are grouped in classes, e.g., each orientation class includes specific objects having an orientation within a predetermined range of degrees pitch, yaw and roll for the class. The positive samples are labeled according to orientation class. Every arbitrary object input to the orientation classifier is classified as having a particular orientation class. If the arbitrary object is not the specific object, the output 211 of the orientation classifier 210 is a random orientation class.

In a preferred embodiment, the orientation classifier uses a decision tree as described by Quinlan, "*Improved use of continuous attributes in C4.5*," Journal of Artificial Intelligence Research 4, 77–90, 1996 incorporated herein by reference.

Each node function is a filter from a set of rectangle filters, described below, and there is no pruning. Every node of the tree is split until a maximum leaf depth is attained or the leaf contains examples of only one node.

Orientation and Object Specific Classifiers

Each classifier in the set of orientation and object specific classifiers 212 is a binary classifier for detecting the specific object at a particular orientation in the detection window. Each classifier in the set is trained on specific objects in one of the orientation classes. The selected classifier 221 is the orientation and object specific classifier trained on specific objects in the orientation class 211 output by the orientation classifier 210.

Each of the orientation classes described above can include image samples in a range of degrees of rotation about one or all of the three major axes, for example, in a preferred embodiment, the range can be ±15°. The filters we describe below can be rotated by 90°. Therefore, each orientation and object specific classifier can also be rotated by 90°. As an example, a frontal face detector trained at 0°, can be rotated about the z-axis to yield detectors for 90°, 180° and 270° as well. The same rotations can be performed on classifiers trained at 30° and 60° respectively. Taking into account the range of ±15° in this example, all frontal-rotation orientation classes can be covered by 12 classifiers, as opposed to 360 classifiers. Similar classifiers can be trained for other orientations.

Filters, Features, and Classifiers

Formally, operations with our filters, features and classifiers of the preferred embodiment are defined as follows, see U.S. patent application Ser. No. 10/200,726, "Object Recognition System," filed by Viola et al., on Jul. 22, 2002, incorporated herein by reference. An image feature $h_i(x)$ is assigned a weight $\alpha_j$ or $\beta_j$ according to $$h_j(x) = \begin{cases} \alpha_j & \text{if } f_j(x) > \theta_j \\ \beta_j & \text{otherwise} \end{cases},$$

where a filter $f_j(x)$ is a linear function of an image x, i.e., a detection window, and $\theta_j$ is a predetermined filter threshold value. An cumulative sum C(x) is assigned a value 1 or 0 according to $$C(x) = \begin{cases} 1 & \text{if } \sum_j h_j(x) > T \\ 0 & \text{otherwise} \end{cases},$$

where $h_j$ are multiple features of the image x, and T is a predetermined classifier threshold.

The selected orientation and object specific classifier 230 rejects the arbitrary object 201 when an accumulated score is less than the classifier threshold and classifies the arbitrary object as the specific object 231 when the cumulative score is greater than the classifier threshold.

In the preferred embodiment, our system uses rectangle filters as described by Viola et al., above. FIGS. 3A–D show three types of known rectangle filters that the invention can use. The value of a two-rectangle filter is the difference between the sums of the pixels within two rectangular regions 301–302. The regions have the same size and shape and are horizontally, see FIG. 3A, or vertically, see FIG. 3B, adjacent. A three-rectangle filter computes the sum within two outside rectangles 303 subtracted from twice the sum in a center rectangle 304, see FIG. 3C. Finally a four-rectangle filter computes the difference between diagonal pairs of rectangles 305–306, see FIG. 3D.

It should be noted that tens of thousands other simple configurations of rectangle filters can be used. The filters can be of various sizes to match the sizes of the detection windows. For two rectangle filters, the sum of intensities of the pixels within the unshaded rectangle are subtracted from the sum of the intensity of the pixels in the shaded rectangle. For three-rectangle filters, the sum of pixels in unshaded rectangle is multiplied by two to account for twice as many shaded pixels, and so forth. Other combinatorial functions can also be used with the filters according to the invention. We prefer simple operations for our filters because they are very fast to evaluate, when compared with more complex filters of the prior art.

Figure 4B:
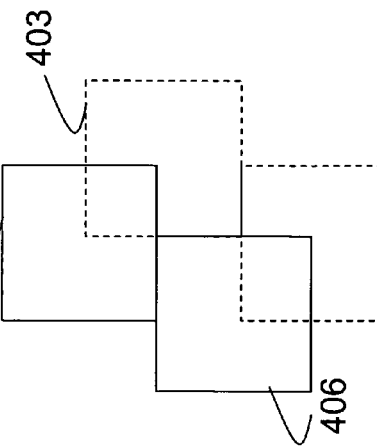
FIG. 4A–4D are block diagrams of rectangular filters arranged diagonally.
Figure 4D:
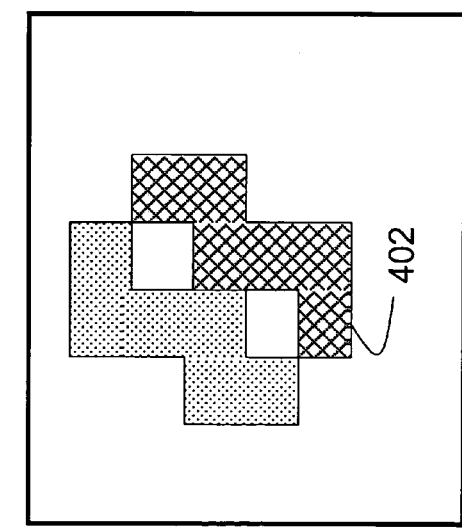
Figure 4A:
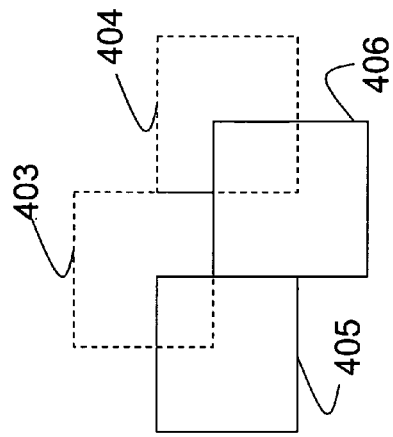
Figure 4C:
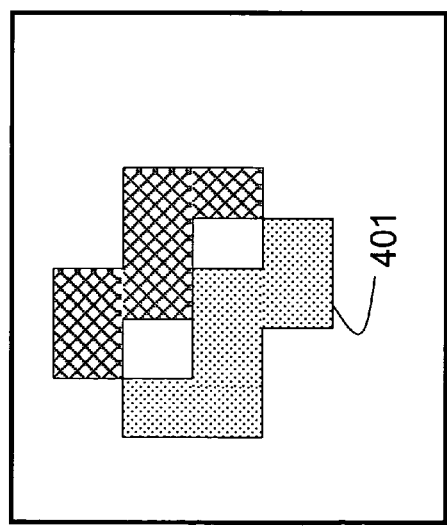

We also use a rectangle filter that has its internal components arranged diagonally. FIGS. 4A and 4C show variations of the rectangle filter that places the filters along a diagonal in the detection window 410. These diagonal filters 401–402 provide improved accuracy over the three types of filters described above for detecting non-upright faces and non-frontal faces. As shown in FIGS. 4B and 4D, the diagonal filters 401–402 are four overlapping rectangles 403–406, that combine to yield the blocky diagonal regions 408–409. These filters operate in the same way as the rectangle filters in FIG. 3. The sum of the pixels in the shaded region 408 is subtracted from the sum of the pixels in shaded region 409. Diagonal filters are sensitive to objects at various orientations. The angle of the diagonal can be controlled by the aspect ratios of the component rectangles within the filter. Depending on their design, these rectangle filters can be evaluated extremely rapidly at various scales, orientations, and aspect ratios to measure region averages.

It is to be understood that various other adaptations and modifications may be made within the spirit and scope of the invention. Therefore, it is the object of the appended claims to cover all such variations and modifications as come within the true spirit and scope of the invention.

We claim:

1. A method for detecting a specific object in an image, comprising:

determining an orientation of an arbitrary object in an image using an orientation classifier for the specific object;

selecting one of a plurality of orientation and object specific classifiers according to the orientation; and classifying the arbitrary object in the image as the specific object with the selected orientation and object specific classifier, and wherein the classifying further comprises:

evaluating a linear combination of a set of filters on the image to determine a cumulative score;

repeating the evaluating while the cumulative score is within a range of an acceptance threshold and a rejection threshold for the specific object; and otherwise accepting the image as including the specific object when the cumulative score is greater than the acceptance threshold.

2. The method of claim 1 wherein the determined orientation is within a predetermined range of degrees of pitch, yaw and roll for a particular orientation class.

3. The method of claim 2 wherein the particular orientation class is associated with a set of orientation classes.

4. The method of claim 3 wherein each orientation class in the set of orientation classes has a distinct predetermined range of degrees of pitch, yaw and roll for the class.

5. The method of claim 3 wherein the selecting further comprises:

associating one of the plurality orientation and object specific classifiers with a particular orientation class.

6. The method of claim 1 further comprising:

rejecting the image as including the specific object when the accumulated score is less than the rejection threshold.

7. The method of claim 6 wherein the determining further comprises:

evaluating the set of filters on the image using a decision tree, wherein a rectangle filter from the set of filters is applied at each node on the tree to determine a feature, and wherein the feature determines a next node of the tree to traverse.

8. The method of claim 7 further comprising:

partitioning the image into a plurality of detection windows;

scaling the detection windows to a plurality of sizes; and evaluating the set of filters on the scaled detection windows.

9. The method of claim 7 further comprising:

partitioning the image into a plurality of detection windows having different sizes and positions;

scaling the detection windows to a fixed size to a size of the detection windows, wherein the steps of determining and evaluating are performed on the scaled detection windows.

10. The method of claim 7 wherein the set of filters includes diagonal rectangle filters.

* * * * *